United States Patent [19]

Marriott et al.

[11] Patent Number: 5,288,272

[45] Date of Patent: Feb. 22, 1994

[54] BEARING RETAINER FOR U-JOINT SHAFT END AND METHOD OF ASSEMBLING BEARING ASSEMBLY

[75] Inventors: Thomas J. Marriott, Temperance, Mich.; Martin J. Pearson, Toledo, Ohio

[73] Assignee: Dana Corporation, Toledo, Ohio

[21] Appl. No.: 683,396

[22] Filed: Apr. 10, 1991

[51] Int. Cl.⁵ ............................................. F16D 3/41
[52] U.S. Cl. .................................. 464/128; 29/898.07
[58] Field of Search ........................ 464/128–133; 384/448, 559, 564, 584, 477; 29/898.04, 898.062, 898.07

[56] References Cited

U.S. PATENT DOCUMENTS

| | | | |
|---|---|---|---|
| 1,617,660 | 2/1927 | Young | 384/564 |
| 1,786,326 | 12/1930 | Wells | 384/560 |
| 1,850,566 | 3/1932 | Roed | 267/161 |
| 1,869,890 | 8/1932 | Gibbons | 384/564 |
| 2,036,977 | 4/1936 | Anderson | 464/130 |
| 2,124,803 | 7/1938 | Wollner | 464/130 |
| 2,132,816 | 10/1938 | Wollner | 464/130 |
| 2,171,313 | 8/1939 | Pearce | 464/130 |
| 2,212,763 | 8/1940 | Wollner | 464/130 |
| 2,228,715 | 1/1941 | Wollner | 464/130 |
| 2,770,114 | 12/1956 | Slaght | 464/130 |
| 2,773,367 | 12/1956 | Slaght | 464/131 X |
| 2,794,693 | 6/1957 | Burkhalter et al. | 384/560 |
| 2,916,896 | 12/1959 | Miller, Jr. | 464/130 X |
| 2,976,091 | 3/1961 | Miller, Jr. | |
| 3,074,255 | 1/1963 | Reinecke | 464/128 |
| 3,200,615 | 8/1965 | Stokely | 464/128 X |
| 4,173,129 | 11/1979 | Durham | |
| 4,637,740 | 1/1987 | Olschewski et al. | 464/128 X |
| 4,874,349 | 10/1989 | Gall | 464/131 X |
| 4,934,979 | 6/1990 | Gille et al. | 464/130 |
| 4,943,262 | 7/1990 | Schultz | 464/131 |

FOREIGN PATENT DOCUMENTS

| | | | |
|---|---|---|---|
| 3115659 | 11/1982 | Fed. Rep. of Germany | 464/128 |
| 2168782 | 6/1986 | United Kingdom | 464/128 |

*Primary Examiner*—Daniel P. Stodola
*Attorney, Agent, or Firm*—Dykema Gossett

[57] ABSTRACT

A bearing assembly used on cardan universal joint shafts includes a bearing retainer that maintains a plurality of needle bearings at a desired location during shipment. The bearing retainer maintains the bearing assembly on the shaft prior to assembly. The bearing retainer preferably has an inner periphery diameter that is less than the outer diameter of the shaft, and an outer diameter that is less than the inner diameter of the bearing housing. In a method of assembly, the shaft is inserted into the bearing retainer, which locks on the shaft outer periphery at its inner peripheral surface. Clearance is provided at the retainer outer periphery such that it rotates with the shaft within the housing.

15 Claims, 1 Drawing Sheet

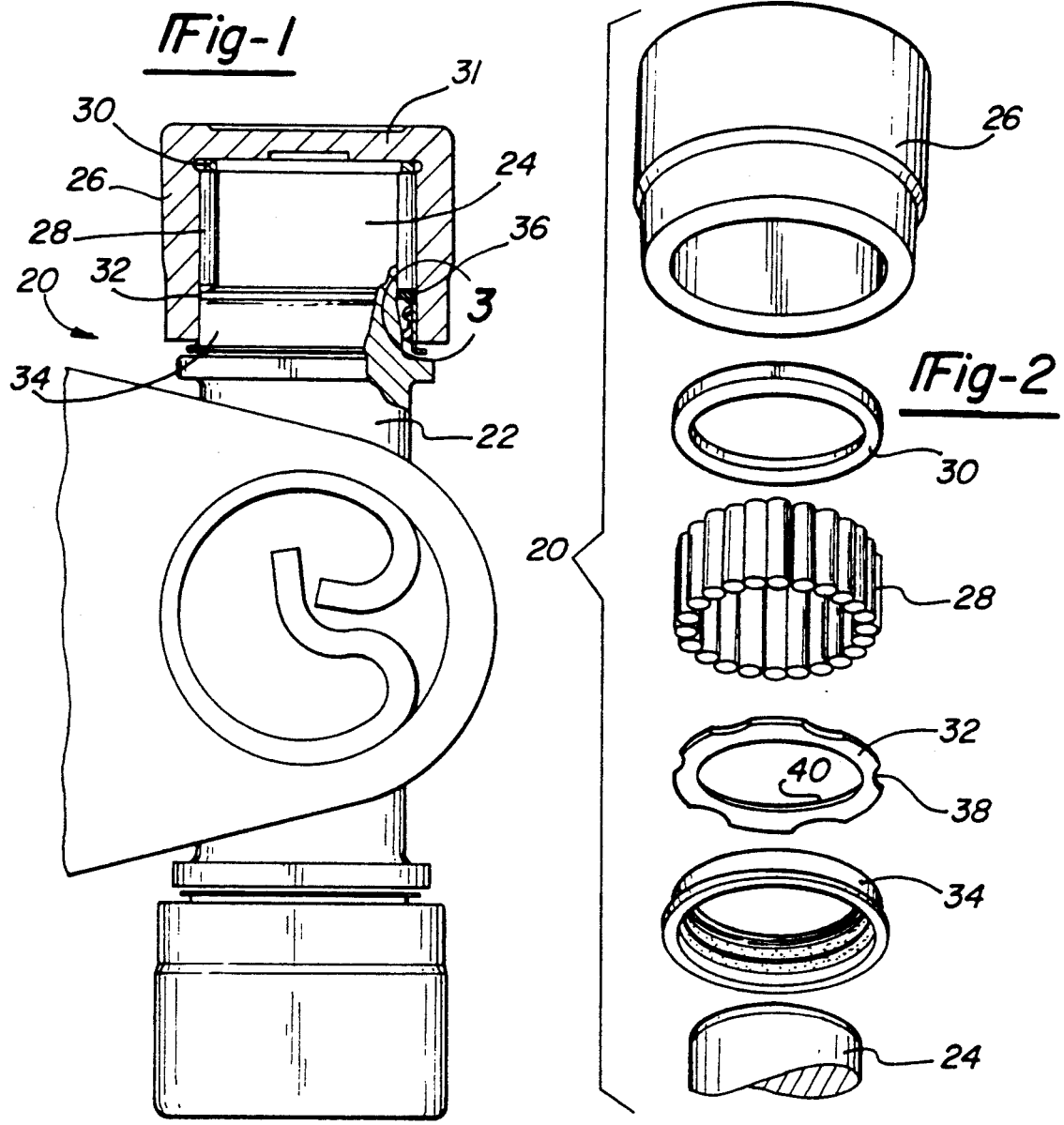
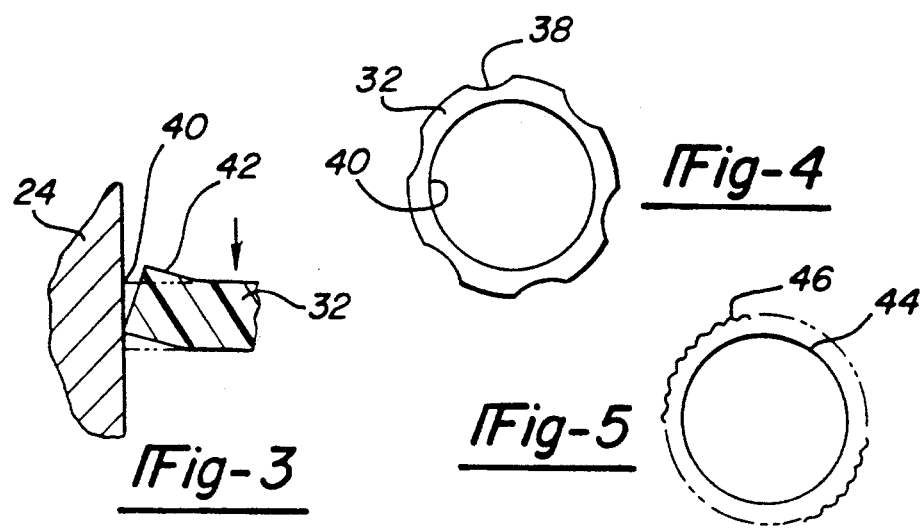

5,288,272

BEARING RETAINER FOR U-JOINT SHAFT END AND METHOD OF ASSEMBLING BEARING ASSEMBLY

BACKGROUND OF THE INVENTION

This application relates to a unique bearing retainer that has particular utility in supporting a universal joint shaft.

Prior art universal joints have shaft ends which may each be mounted in a bearing cup that receives a plurality of needle bearings. The shafts rotate through limited angular extents relative to the bearing cup as the universal joint operates. Bearing retainers may be used with these bearings to retain the needle bearings in a proper position during shipment. Prior art bearings utilize a plurality of different types of bearing retainers that may not lock the shaft within the bearing cup during shipment.

SUMMARY OF THE INVENTION

A bearing assembly for a shaft is disclosed that includes a bearing retainer which maintains the shaft within the bearing assembly during shipment, and also during use. In a preferred embodiment, the bearing assembly includes a housing extending between first and second axial ends. A plurality of bearing members are received within the housing and some means is provided to prevent the bearing members from moving beyond the first end of the housing. In a preferred embodiment the housing is cup-shaped and closed at the second end. A retainer is disposed near the open second end of the housing and retains the bearing members within the housing.

The bearing retainer preferably has a bore at an inner periphery that is smaller than the outer diameter of the shaft to be received within the bearing assembly. The inner periphery of the bearing retainer also extends radially inwardly beyond the inner periphery of the bearing members. The shaft is inserted into the bearing housing and the bearing retainer is interference fit onto the shaft. The inventive bearing is retained upon the shaft during shipment, and need not be removed prior to use. The bearing retainer remains within the housing during operation of the universal shaft.

In a preferred embodiment a seal is placed within the housing on an opposed side of the bearing retainer from the bearing members. This seal secures the bearing retainer within the housing. Since the bearing retainer is secured within the housing, the bearing retainer maintains the shaft within the housing.

The inventive bearing retainer maintains the bearing members in a desired position during use, and prevents the bearing members from contacting and damaging the seal during use.

In a further preferred embodiment the bearing retainer has an outer diameter less than the inner diameter of the housing such that there is a clearance between the two. The bearing retainer can thus rotate with the shaft within the bearing housing, and will not interfere with the other members of the bearing assembly. The shaft is preferably a carden universal joint cross shaft. The shaft does not actually rotate through 360° within the bearing. The term rotation as used throughout this application may refer to movement of the shaft through a limited angular extent relative to the bearing housing. It should be understood, however, that the inventive bearing has benefits which extend to other types of shafts, including fully rotating shafts.

In a method of assembling a bearing assembly of the present invention, a bearing cup receives a plurality of the bearing members. An optional spacer may be inserted into the bearing cup prior to the bearing members. The bearing retainer is then placed within the cup and a seal is inserted to secure the bearing retainer. A shaft is then inserted into the cup and deflects the inner periphery of the bearing retainer axially further into the cup. The retainer locks on the shaft end, securing the bearing assembly to the shaft.

These and other objects and features of the present invention can be best understood from the following specification and drawings.

BRIEF DESCRIPTION OF THE DRAWINGS

FIG. 1 is a largely schematic view of a universal joint embodying the inventive bearing of the present invention.

FIG. 2 is an assembly view of an inventive bearing.

FIG. 3 is a view along line 3 as shown in FIG. 1.

FIG. 4 is a front view of a bearing retainer according to the present invention.

FIG. 5 is a view similar to FIG. 4, but showing a second embodiment of the bearing retainer.

DETAILED DESCRIPTION OF A PREFERRED EMBODIMENT

Shaft bearing assembly 20 for mounting cardan universal joint shaft 22 is illustrated in FIG. 1. Shaft 22 has shaft end 24 received in bearing cup 26, with a plurality of needle bearings 28 rotatably guiding shaft end 24. Spacer 30 is received between cup end 31 and needle bearings 28. Retainer 32 is received in the open end of bearing cup 26 and maintains bearings 28 in a desired position.

Retainer 32 has an inner periphery diameter that is less than the outer diameter of shaft end 24, and thus locks in an interference fit onto shaft end 24. The outer diameter of retainer 32 is less than inner periphery diameter of bearing sup 26, providing clearance 36 such that retainer 32 moves freely within bearing cup 26 as shaft end 24 rotates. The term rotation as used within this application may refer to the normal movement through a limited angular extent that shaft 22 may perform relative to bearing cup 26 during operation of a universal joint. It should be understood, however, that the inventive bearing has benefits which extend to other types of shafts, including fully rotating shafts.

Seal 34 is forced into the open end of bearing cup 26 and maintains bearing retainer 32 in a desired position. Retainer 32 ensures that bearing cup 26 remains on shaft end 24, particularly during shipment. Retainer 32 also ensures that needle bearings 28 do not contact seal 34 during shipment or use.

FIG. 2 is an exploded view of bearing assembly 20. Cup 26 initially receives spacer 30, then a plurality of needle bearings 28, and then bearing retainer 32. Retainer 32 has a plurality of scalloped openings 38 at an outer periphery which allow air or lubricating fluid to move between the axial sides of retainer 32. Seal 34 is inserted and secures bearing retainer 32 within cup 26. Shaft end 24 is then forced into bearing cap 26, and its outer periphery is forced into an interference fit in the inner periphery 40 of retainer 32. The assembly is relatively simple and may be performed mechanically.

As shown in FIG. 3, when shaft end 24 is forced into inner periphery 40, bearing retainer 32 deflects or bends to position 42, locking on shaft end 24. The deflected retainer 32 could be described as having a circular concave deflection at inner periphery 40. When shaft end 24 rotates relative to bearing cup 26, retainer 32 rotates with the shaft. Since there is clearance 36 at the outer periphery of bearing retainer 32, this rotation does not affect the other portions of bearing assembly 20.

FIG. 4 is a front view of bearing retainer 32 including scalloped openings or notches 38. Inner periphery 40 is smaller than the outer diameter of a shaft with which the retainer is to be used.

FIG. 5 shows an alternative embodiment retainer 44. Bearing retainer 44 has a number of small openings or notches 46 at its outer periphery which allow fluid to flow between its axial faces.

A bearing retainer for use on the shaft having an outer diameter of 0.659-0.670 inches may have an inner diameter between 0.647 and 0.650 inches. Such a sized bearing retainer would preferably be 0.020-0.025 inches in width. The bearing retainer is formed from a plastic or elastomeric material. Preferably, nylon is used. Most preferably, Nylatron TM is used. The seal is preferably metal-backed. The other portions of bearing assembly 20 are formed of known materials.

A preferred embodiment of the present invention has been disclosed, however, a worker of ordinary skill in the art would recognize that certain modifications would come within the scope of this invention. For that reason the following claims should be studies in order to determine the true scope and content of this invention.

We claim:

1. A universal joint comprising:
   a bearing assembly including a housing having first and second ends and an inner peripheral surface defining a housing bore of a first bore diameter;
   at least one shaft having an outer diameter, said shaft rotatably received in said bearing assembly;
   a plurality of bearing members received within said housing bore, and means at said first end of said housing to prevent movement of said bearing members beyond said first end of said housing;
   said shaft having an end portion extending into said housing bore from said second end of said housing and not extending beyond said first end of said housing, said bearing members contacting an outer peripheral surface of said shaft; and
   a flexible, ring-shaped bearing retainer mounted adjacent said bearing members and entirely on a side of said bearing members spaced axially towards said second end of said housing to axially retain said bearing members within said housing bore and to maintain said housing on said shaft, said bearing retainer having an inner peripheral surface defining a bearing retainer bore of a second bore diameter which is less than said shaft outer diameter, said shaft end portion having an interference fit with said bearing retainer bore, wherein said shaft end portion deflects the inner periphery of said bearing retainer toward said first end of said housing, said bearing retainer bore being axially displaced towards said first end of said housing, thereby locking said bearing retainer on said shaft.

2. A universal joint as recited in claim 1, wherein a seal is forced into said housing from said second end, and on a side of said bearing retainer spaced axially toward said second end, to secure said bearing retainer within said housing.

3. A universal joint as recited in claim 1, wherein said bearing retainer has an outer diameter less than said first bore diameter such that there is a clearance between said bearing retainer and said housing inner peripheral surface.

4. A universal joint as recited in claim 3, wherein an outer peripheral surface of said bearing retainer in non-circular and said inner peripheral surface of said housing is circular such that clearances exist between said bearing retainer outer peripheral surface and said housing inner peripheral surface.

5. A universal joint as recited in claim 1, wherein said bearing members are elongate needle bearings.

6. A universal joint as recited in claim 1, wherein said housing is cup-shaped with an open second end and said means to prevent movement is a closed face on said housing at said first end.

7. A universal joint as recited in claim 1, wherein said bearing retainer is formed from a nylon material.

8. A universal joint as recited in claim 1, wherein said bearing retainer has an outer peripheral surface including a plurality of circumferentially-spaced notches.

9. A universal joint as recited in claim 1, wherein said bearing retainer has a generally circular substantially concave surface at said inner periphery.

10. A universal joint comprising:
    a bearing assembly including a housing having first and second ends and an inner peripheral surface defining a housing bore of a first bore diameter;
    at least one shaft having an outer diameter, said shaft rotatably received in said bearing assembly;
    a plurality of bearing members received within said housing bore, and means at said first end of said housing to prevent movement of said bearing members beyond said first end of said housing, said shaft having an end portion extending into said housing bore from said second end of said housing and not extending beyond said first end of said housing, said bearing members contacting an outer peripheral surface of said shaft;
    a flexible, ring-shaped bearing retainer mounted adjacent said bearing members and entirely on a side of said bearing members spaced axially towards said second end of said housing to axially retain said bearing members within said housing bore and to maintain said housing on said shaft, said bearing retainer having an inner peripheral surface defining a bearing retainer bore of a second bore diameter which is less than said shaft outer diameter, said shaft end portion having an interference fit with said bearing retainer bore, wherein said shaft end portion deflects the inner periphery of said bearing retainer toward said first end of said housing, said bearing retainer bore being axially displaced towards said first end of said housing, said bearing retainer having a generally circular substantially concave surface at said inner periphery, thereby locking said bearing retainer on said shaft, said bearing retainer having an outer diameter which is less than said first bore diameter such that there is a clearance between said bearing retainer and said housing inner peripheral surface; and
    a seal force fit in said housing on a side of said retainer spaced axially toward said second end of the housing to assist in securing said bearing retainer within said housing.

11. A universal joint as recited in claim 10, wherein said bearing retainer has an outer peripheral surface including a plurality of circumferentially-spaced notches.

12. A universal joint as recited in claim 10, wherein said bearing retainer is formed of a nylon material.

13. A method of assembling a bearing comprising the steps of:
   (1) disposing a plurality of bearing members within a housing;
   (2) providing a bearing retainer having a bore at an inner peripheral surface with a diameter selected to be less than the outer diameter of a shaft to be mounted within the housing;
   (3) inserting the bearing retainer into the housing to axially retain the bearing members; and
   (4) inserting a shaft into the housing and through the bearing retainer bore such that the shaft deflects the inner periphery of the bearing retainer axially towards said bearing members, to thereby lock said bearing retainer onto the shaft outer peripheral surface.

14. A method as recited in claim 13, further comprising the step of inserting a seal into the housing on an opposed side of the bearing retainer from the bearing members, the seal securing the bearing retainer within the housing, the seal being inserted into the housing prior to step (4).

15. The method of assembling as recited in claim 13, wherein a generally circular substantially concave surface at the inner periphery of said bearing retainer being formed by the deflection of step (4).

* * * * *